A. DUTREUX.
STARTING ARRANGEMENT FOR INTERNAL COMBUSTION ENGINES IN WHICH AN ELECTRIC STARTING MOTOR IS USED.
APPLICATION FILED JULY 21, 1915.
1,257,821.
Patented Feb. 26, 1918.
2 SHEETS—SHEET 1.
*Fig. 1*
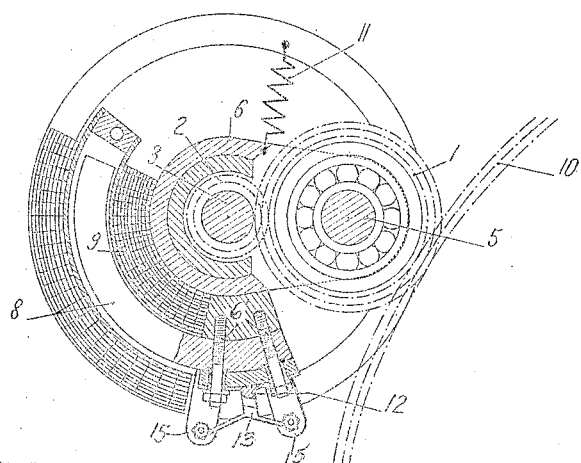
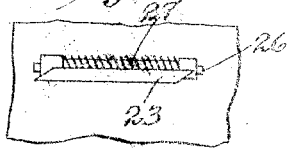
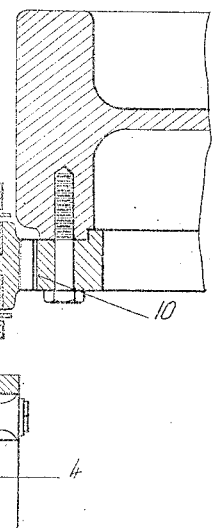
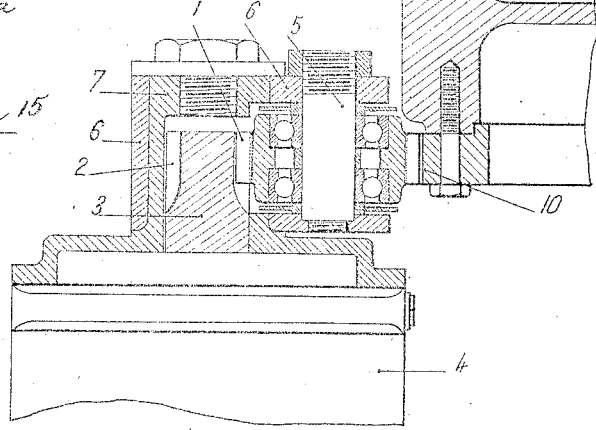
INVENTOR A. DUTREUX.
STARTING ARRANGEMENT FOR INTERNAL COMBUSTION ENGINES IN WHICH AN ELECTRIC STARTING MOTOR IS USED.
APPLICATION FILED JULY 21, 1915.

1,257,821.

Patented Feb. 26, 1918.
2 SHEETS—SHEET 2.

INVENTOR
Auguste Dutreux
by Kenwin Goldsborough & Neill
Attys

UNITED STATES PATENT OFFICE.

AUGUSTE DUTREUX, OF ISSY-LES-MOULINEAUX, FRANCE, ASSIGNOR TO THE SOCIETE ANONYME POUR L'ECLAIRAGE ELECTRIQUE DES VEHICULES, OF ISSY-LES-MOULINEAUX, FRANCE, A CORPORATION OF FRANCE.

STARTING ARRANGEMENT FOR INTERNAL-COMBUSTION ENGINES IN WHICH AN ELECTRIC STARTING-MOTOR IS USED.

1,257,821.   Specification of Letters Patent.   Patented Feb. 26, 1918.

Application filed July 21, 1915. Serial No. 41,155.

*To all whom it may concern:*

Be it known that I, AUGUSTE DUTREUX, citizen of the French Republic, residing at Issy-les-Moulineaux, Department of the Seine, in France, have invented certain new and useful Improvements in Starting Arrangements for Internal-Combustion Engines in which an Electric Starting-Motor is Used; and I do hereby declare the following to be a full, clear, and exact description of the invention, such as will enable others skilled in the art to which it appertains to make and use the same.

This invention has for its object to provide an improved starting arrangement for explosion motors in which an electric motor is employed. The arrangement presents the following characteristics.

1. An electromagnet effects the coupling of the two motors, which coupling is maintained by the direction of rotation of the pinions constituting the same.

2. The closure of appropriate contacts subsequently effects the direct connection of the electric motor with the source of current as well as the cutting out of the electromagnet, the starting of the explosion motor following automatically the breakage of the coupling and the opening of the electric circuit. The improved arrangement has the advantage of always insuring the meshing of the pinions forming the coupling because the electric motor turns first of all with a slow speed, and of preventing the motor from giving its full power before the coupling is completely effected. Further, the starting of the explosion motor brings about automatically with the disengagement of the coupling, the opening of the circuit of the electric motor.

In the accompanying drawing one manner in which the improved arrangement of this invention can be carried into effect is shown by way of example.

Figure 1 is a cross section on a plane perpendicular to the axis of the electric motor of the starting arrangement.

Fig. 1ª is a side elevation of a portion of the device looking at right angles to Fig. 1.

Fig. 2 is a cross section on the axis of the electric motor.

Figure 4:
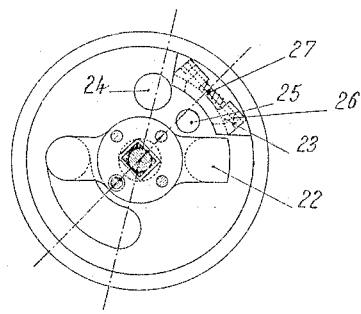
Figure 6:
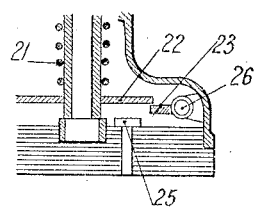

Fig. 4ª is a fragmental elevation of a fragment of the device.

In the form of the arrangement shown in the drawing the coupling between the electric motor and the explosion motor is brought about by means of a pinion 1 always in mesh with a pinion 2 fixed on the shaft 3 of the electric motor 4. The pinion 1 is mounted loose on a shaft 5 supported by a link 6 surrounding a casing 7 concentric with the shaft 3 of the electric motor. In this way the shaft 5 can oscillate around the shaft 3, the pinion 1 remaining constantly in engagement with the pinion 2 fixed on the shaft of the electric motor. The link 6 for the shaft 5 is rigid with a core 8 moving within a coil or solenoid 9, being secured thereto by screws 6'.

The shaft 5 in oscillating around the shaft 3 causes the pinion 1 to engage with the gear wheel 10 mounted on the flywheel of the explosion motor. Normally the pinion 1 is held out of engagement with the gear wheel 10 by a spring 11. The armature 8 of the electromagnet is provided with a contact 12 which coöperates with a fixed contact 13 when by the displacement of the shaft 5 the pinion 1 engages the gear wheel 10. Current is led to the contacts 12, 13 by means of blocks and screws 15.

Figure 3:
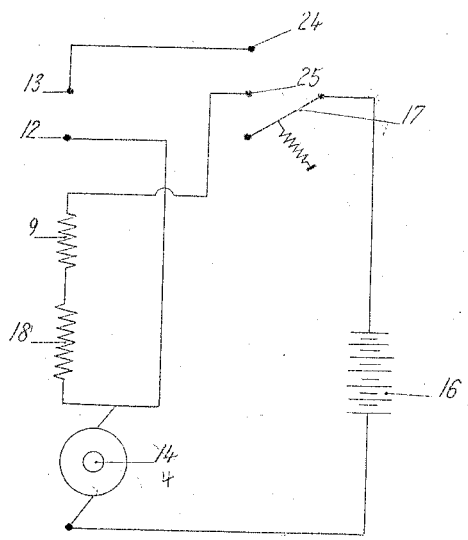
Fig. 3 is a diagram of the electric connections.

Fig. 3 shows the connections of the electric circuits. A three-way switch 17 controls the connection in circuit of a battery of accumulators 16 with the electric motor 4. In its first closed position the switch 17 completes the circuit of the electromagnet 9 over a suitable resistance 18 and the electric motor 4. In its second closed position the switch 17 opens the circuit of the electromagnet 9 and connects directly without the interposition of any resistance the electric motor 4 with the battery of accumulators 16.

Figure 5:
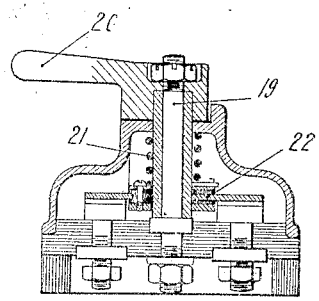
Figs. 4, 5 and 6 show in plan and in cross section a three-way switch.

The three-way switch 17 is shown in detail in Figs. 4 and 5. The shaft 19 of the switch is operated by a handle 20 and is firmly connected to an insulated plate 22 forced into engagement with the contacts 25 and 24 by a spring 21.

An accessory device enables the plate 22 to pass from its "off" position to the black 24, passing over the block 25 and to return from the block 24 to its "off" position without touching the block 25. In the constructional form shown by way of example this device consists of a cam 23 capable of oscillating between two limiting positions about a pivot 26 fixed at its ends to the switch. This cam is forced downward to a position somewhat above the block 25 by a spring 27 and is provided at its two extremities with ramps.

When the plate 22 is moved from its off position toward the block 24 owing to the spring 21 it slides below the cam 23 by the corresponding ramp, raises it and engages successively the blocks 25 and 24. In the reverse direction the plate 22 leaves the block 24, passes by the ramp over the cam which separates it from the block 24 and returns without touching the latter to its initial position.

The operation of the arrangement thus described and illustrated is as follows.

The two motors being at rest the pinion 1, owing to the action of the spring 11, is withdrawn from the gear wheel 10 fixed on the flywheel of the explosion motor. By rotating the switch 17 into its first operative position the electromagnet 9 is put in circuit with the resistance 18 and the electric motor 4, the pinion 1 being brought into contact with the gear wheel 10 by the attraction of the core 8 of the solenoid 9. The motor 4 then commences to rotate. The pinion 1 meshes with the gear wheel 10, the contacts 12 and 13 are in engagement and the switch 17 is moved to its second operative position in which the current passes directly to the electric motor 4 by the contacts 12 and 13 the electromagnet 9 being cut out of circuit. The direction of the force exerted on the teeth of the pinion 1 by reason of the rotation of the latter in contact with the gear wheel 10 insures the continuous engagement of the teeth of the pinion 1 with the gear wheel 10. When the electric motor 4 runs at full power the explosion motor is started up by means of the pinions 2 and 1. As soon as the starting has been effected the gear wheel 10 turns at a greater speed than that of the pinion 1, the direction of the reactions undergone by the teeth of the latter pinion, as a result, become reversed and their effect aided by the tension of the spring 11 brings about a breakage of the coupling. At the same moment that the breakage of the coupling takes place contacts 12 and 13 separate and open the circuit of the electric motor 4. The switch 17 returns to its "off" or zero position without again passing through its first position in which the circuit of the electromagnet 9 is completed.

By the arrangement which has just been described the pinion 1 is brought into engagement with the gear wheel 10 when the motor is running at a low speed. It is impossible to operate the motor at full power when the pinions are not in engagement, and it is therefore impossible to obtain by a faulty manipulation anything but the nonoperation of the motor. The arrangement herein described provides an arrangement which is a very reliable one for electrically starting explosion motors.

Claim:

In a starting device for explosion engines, a motor, means actuated by the motor to start the engine, electro-magnetic means for moving the aforementioned means to an operative position, an open circuit including the motor, the magnet and suitable resistance in series and a source of energy, a switch for closing the circuit, a second circuit including the motor and a source only, the aforementioned switch being manually operable to break the former circuit and close the latter circuit at one point, the circuit being closed at a second point automatically upon the movement of the starting means to its operative position.

In testimony whereof I affix my signature, in presence of two witnesses.

AUGUSTE DUTREUX.

Witnesses:
CHAS. P. PRESSLY,
HENRI COHEN.